March 2, 1965     R. B. HOUGHTON     3,171,696
APPARATUS FOR REDUCING FRICTION
Filed July 6, 1961
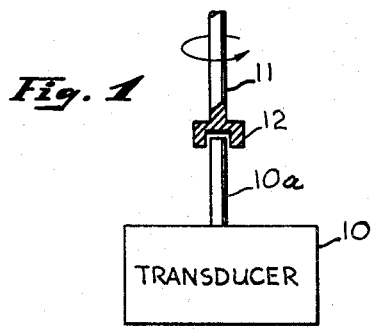
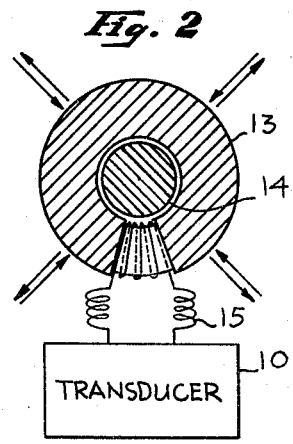
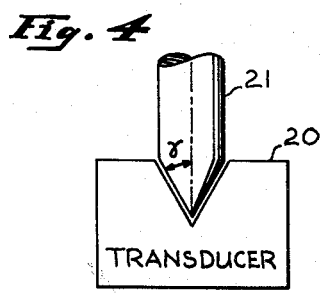
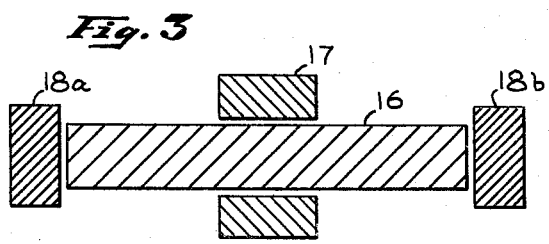
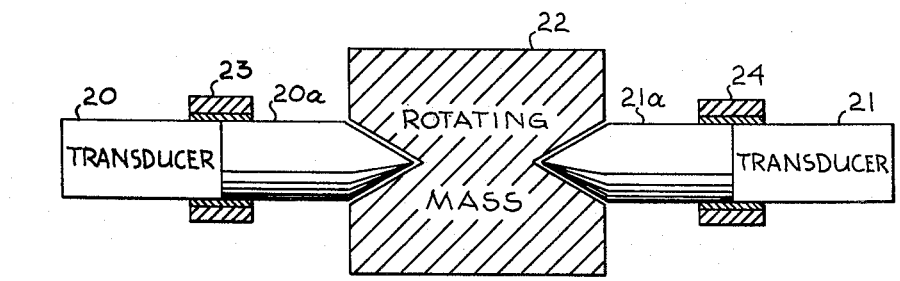
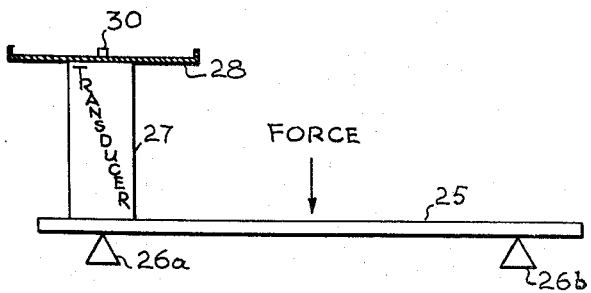
RICHARD B. HOUGHTON
INVENTOR.
BY *Allen E. Botney*
ATTORNEY

United States Patent Office 3,171,696
Patented Mar. 2, 1965

3,171,696
APPARATUS FOR REDUCING FRICTION
Richard B. Houghton, Los Angeles, Calif., assignor to Electro-Sonic Systems Inc., Los Angeles, Calif.
Filed July 6, 1961, Ser. No. 122,298
5 Claims. (Cl. 308—1)

The present invention relates in general to means for reducing the frictional forces encountered between moving parts and more particularly relates to means of the type mentioned that employ ultrasonic techniques.

Friction is a well-known phenomenon and is experienced whenever two members of a machine or of some other mechanical arrangement move relative to each other. As is equally well-known, friction has many disadvantages associated with it. Thus, it produces heat that causes the moving members to wear. Furthermore, friction is, in a sense, a resistance type of force in that because of it one member resists being moved across the other. As a result, an additional force must be applied to the moving member to overcome the frictional force, which represents a loss of power. For these reasons, many different attempts have been made in the past to reduce friction as much as possible. The most commonplace means used are, of course, the lubricating fluids, which are used to fill the spaces between moving machinery parts. The thin film of liquid reduces the friction and makes the parts move more easily and produces less heat. Again, jets of air or some other kind of gas have also been used between moving parts to reduce friction, but this technique is relatively complex, may be employed only with difficulty, and is applicable only when circumstances permit.

The present invention involves a new and novel attempt to minimize these frictional forces and their deleterious effects, the success of the invention being due to the fact that ultrasonic principles or techniques are utilized. More specifically, one of the two members that are moving relative to each other is made to vibrate at some predetermined ultrasonic frequency, in consequence of which the time during which the members are in contact with each other is very greatly reduced. This, in turn, has the effect of correspondingly reducing the frictional forces that are normally encountered, the attendant advantage, as will be recognized by those skilled in the mechanical arts, being that mechanical systems may now be provided having greatly increased reliability, accuracy, and lifetime or usefulness.

The present invention may be used with great benefit in almost any kind of mechanical arrangement where friction is to be minimized. Thus, for example, it would be of great value in bearing arrangements, whether they be of the thrust or journal type. Again, by way of example, it could be employed to substantially reduce sliding friction and this, in turn, could be used to provide a most novel system for detecting and measuring exceptionally small angles of deflection. The above-stated examples will be described below in great detail as embodiments of the invention. It should be emphasized, however, that an invention of the kind herein involved has widespread application in that it may be used wherever it is desired to reduce the effects of friction. In other words, it should be expressly understood that the accompanying drawings are for the purpose of description and illustration only and are not intended as a definition of the limits of the invention.

It is, therefore, an object of the present invention to provide systems containing moving parts with increased reliability, accuracy, lifetime and usefulness.

It is another object of the present invention to provide a way to eliminate the need for lubricants in so far as they are used to reduce friction and its effects.

It is a further object of the present invention to provide mechanical systems that will operate more efficiently in a high temperature environment than prior systems.

It is an additional object of the present invention to provide mechanical systems that employ ultrasonic techniques to reduce friction therein.

It is still another object of the present invention to provide a means for appreciably improving the performance of mechanical and electro-mechanical systems.

It is a still further object of the present invention to use sonic and ultrasonic waves to reduce friction.

The novel features which are believed to be characteristic of the invention, both as to its organization and method of operation, together with further objects and advantages thereof, will be better understood from the following description considered in connection with the accompanying drawings in which:

FIG. 1 presents one embodiment of the present invention and is illustrated as a thrust bearing;

FIG. 2 presents another embodiment of the present invention and is illustrated as a journal type of bearing;

FIG. 3 illustrates how the embodiments of FIGS. 1 and 2 may be combined;

FIG. 4 illustrates a modified version of the thrust bearing of FIG. 1;

FIG. 5 illustrates how a rotating mass may be supported with the aid of two thrust bearings of the kind shown in FIG. 4;

FIG. 6 presents still another embodiment of the present invention and is illustrated as a system for the detection and measurement of slight angles of deflection.

Referring now to the drawings and in particular to FIG. 1, the thrust bearing therein is shown to include a transducer mechanism 10 to which is coupled a rotating shaft 11, the coupling being accomplished by means of a cap-shaped device 12 which is attached to shaft 11 and rotates with it. Transducer 10 also includes a shaft 10a which extends into coupling device 12 in the manner shown. With respect to the transducer, its function is to convert electrical oscillations applied to it to corresponding mechanical vibrations of shaft 10a and for this purpose may include magnetostrictive or piezo-electric apparatus, both of which are presently existing and available.

In operation, shaft 10a is made to experience a longitudinal displacement with time, that is, shaft 10a is made to vibrate periodically in an axial direction, the vibrations preferably being at sonic or ultrasonic frequencies. In other words, member 10a cyclically moves toward and away from the inside face of device 12 at a sonic or ultrasonic rate or, stated differently, shaft 10a vibrates in a direction that is substantially perpendicular to the inside surface of device 12 that faces member 10a. These vibrations or rapidly occurring periodic displacement of shaft 10a produce a very substantial reduction in friction between the intercoupled parts, with the result that shaft 11 rotates relatively free of friction and its effects although it is supported above shaft 10a.

There are basically two factors which act to reduce the frictional effects to an exceptionally low value in comparison with drive friction effects and in comparison with thrust bearings which employ a lubricant. The first factor is due to the fact that the percentage of time for which there is direct physical contact between shaft 10a and coupling mechanism 12 is very small. The number of contacts per second between the two members is equal to or less than the frequency of vibration of shaft 10a, depending upon the relative velocity of the shaft and the mass. The result of this single factor alone (attainable when the invention is operated within an evacuated chamber) is that frictional effects are orders of magnitude less than those heretofore attainable, that is, the friction is far less than for a thrust bearing operated either with or without a lubricant at the interface. The second factor enters in when the invention is operated in an air, or in general, a gaseous environment. More specifically, each time that shaft 10a and coupling mechanism 12 approach each other, the intervening layer of air (or gas) is compressed, the compressed air or gas then tending to extend the interval of time the two surfaces are apart. Consequently, the frictional part of each cycle that the two surfaces are in contact is less than when the invention is operated in a vacuum. As a matter of fact, if enough electrical power is fed into transducer 10, a permanent cushion of air is formed between members 10a and 12 by the described ultrasonic pumping action, with the result that rotating member 12 is then never in contact with ultrasonic member 10a. Under these circumstances, it will be obvious that the friction is then practically nil and if a force is momentarily applied to shaft 11 so that it is caused to rotate, it will continue to rotate for an exceedingly long time.

Journal bearing devices designed and constructed in accordance with the features of the present invention also show greatly improved performance over previously designed journal bearings. A journal bearing arrangement according to the present invention is shown in FIG. 2 and basically includes a hollow cylindrical magnetostrictive member 13 and a rotating shaft 14 which is inserted through member 13. Using magnetostrictive phenomena, which is well known, member 13 is caused to vibrate ultrasonically in a radial direction as indicated by the arrows surrounding member 13 or, stated differently, member 13 is made to expand and contract radially at the ultrasonic frequency selected. Thus, here again, member 13 vibrates in a direction that is substantially perpendicular to the surface of member 14. As a result, and for the reasons previously mentioned, the period of time during which members 13 and 14 are in direct physical contact with each other is either shortened very greatly or reduced to zero and this, of course, greatly reduces friction between the two members. Thus, again, a member may rotate with considerably less frictional losses and with considerably less wear on interface surfaces.

In order to cause magnetostrictive member 13 to vibrate in the manner heretofore mentioned, a transducer mechanism 10 is coupled to member 13 by means of a coil 15 which is wound around a portion of the member, the coil being set in a depression or cavity cut out of member 13 so that the coil may be flush with the member's surface.

The thrust and journal bearings shown in FIGS. 1 and 2 may be combined, as shown in FIG. 3, to completely support a rotating shaft member without incurring the usual frictional losses. As shown in the figure, the shaft is designated 16 whereas the journal bearing needed is designated 17 and the two thrust bearings required are designated 18a and 18b. Transducer mechanisms for driving the thrust and journal bearing devices are required but are not shown in the figure for sake of convenience. Suffice it to say, therefore, that transducer mechanisms of the type previously described are coupled to members 17 and 18 for the reasons already mentioned, namely, to produce the vibration of these members. In its operation, thrust bearings 18a and 18b operate in substantially the same manner as the thrust bearing device shown and described in connection with FIG. 1 while journal bearing 17 operates in substantially the same manner as the journal bearing device shown and described in connection with FIG. 2.

More specifically, bearings 18a and 18b provide substantially frictionless support of the ends of rotating shaft 16 while bearing 17 provides substantially frictionless support of the shaft intermediate its ends. Accordingly, shaft 16 in FIG. 3 is completely supported in all respects and, therefore, is firmly held in place as it freely rotates.

Referring now to FIG. 4, there is shown a conical pivot point bearing device which, when designed and constructed in accordance with the present invention, will also perform with considerably less frictional losses than heretofore possible. This type of bearing arrangement basically includes a transducer mechanism 20 which acts as a support for a rotating shaft designated 21. As may be seen from the figure, shaft 21 has a conical end which fits into a conically shaped depression in the transducer mechanism. The half angle, $\gamma$, of the cone, is determined by the ratio of the expected radial load to the expected axial load.

Once again, the operation is basically the same. Thus, while it vibrates, transducer 20 is capable of supporting rotating shaft 21 with very greatly reduced frictional effects, the shaft in this case receiving both horizontal and vertical support because of the conically arranged coupling of the parts.

A pair of the conical pivot point bearing devices of FIG. 4 may be adapted and combined to support a rotating mass between them, as is illustrated in FIG. 5. As shown therein, the arrangement includes a pair of transducer mechanisms 20 and 21 between which is positioned a rotating mass 22. The rotating mass is coupled to the transducer mechanisms, the coupling being accomplished by means of a pair of shafts 20a and 21a which extend from transducers 20 and 21, respectively, toward the rotating mass. The ends of shafts 20a and 21a are conically shaped and they fit into similarly shaped depressions on opposite sides of mass 22, as shown in the figure. It will be recognized that it is preferable to have shafts 20a and 21a coaxially aligned. Finally, a pair of nodal clamps 23 and 24 are employed for suitably mounting and supporting the transducers and their shafts. In its operation, transducer mechanisms 20 and 21 respectively make shafts 20a and 21a to vibrate at a selected ultrasonic frequency. Consequently, although rotating mass 22 is supported by shafts 20a and 21a, the contact time between the mass and the shafts is very greatly reduced and, thereby, so is the friction between these elements. The reasons for the reduced contact time were previously explained in connection with the bearing device of FIG. 1 and are equally valid here. Hence, they are not again delineated in order to avoid being redundant. It should be noted, however, that because shafts 20a and 21a provide vertical as well as horizontal support, a journal bearing device as is used in the arrangement of FIG. 3 is not required here.

As was previously emphasized, the present invention provides a myriad of advantageous possibilities, such as the use illustrated in FIG. 6 in which is found an arrangement for the detection and measurement of small angles. Accordingly, referring now to FIG. 6, a bar 25 is shown supported at two points by means of fulcrums 26a and 26b, the fulcrums preferably being positioned near the ends of the bar. Above one of the fulcrum support points, such as above fulcrum 26a, a transducer mechanism 27 is mounted on the bar, the transducer, as before, being the type of device that will provide vibrations in a vertical direction at ultrasonic frequencies. Mounted on top of and attached to transducer 27 is a vessel of some sort, such as a very flat pan 28. Placed in pan 28 at the center thereof is a small object 30 which also has a very flat surface that is in contact with the flat surface of the pan. Object 30 is freely movable anywhere in the pan which may be calibrated for reasons that will be made clear below, the calibrations being those of distance from the center of the pan.

In operation, when transducer 27 is made to oscillate or vibrate at an ultrasonic frequency, pan 28 also vibrates, that is, moves up and down at that frequency. As a result of the vibrations, object 30 is free to move across the surface of the pan with substantially no friction between them. Assuming now that bar 25 is perfectly horizontal and that transducer 27 provides exactly vertical vibrational motion, object 30 will remain in the position it was placed in, namely, at the center of the pan. However, if a force is applied in a vertical direction, either up or down, against bar 25 between fulcrums 26a and 26b, as is indicated by the arrow in the figure, the bar will become slightly distorted in that it will be displaced through a small angle around fulcrums 26a and 26b. In other words, a deflection will take place. As a result of this bending or angular displacement of bar 25, object 30 will now become displaced from its central position and move toward the outside of pan 28 at a speed that is determined by the angular displacement of bar 25 around fulcrum 26a. Thus, by measuring the speed of object 30, the intervals of time involved, the displacement of object 30 from its initial position, etc., the angle through which bar 25 is rotated around fulcrum 26a as a result of the force applied to the bar can be determined with great accuracy.

The system was made possible by the fact that a nearly frictionless relationship exists between pan 28 and object 30. Furthermore, where it was practically impossible and certainly extremely difficult to measure very small angular displacements heretofore, the present invention makes it possible to make such measurements easily and quickly. Moreover, since the angular displacement is related in some exact manner to the composition and structure of bar 25, the present invention also makes it possible to readily obtain data concerning different materials, such as their strength, etc.

From the above descriptions, it can be seen that the present invention very substantially reduces friction irrespective of the type of motion involved, that is, irrespective of whether the friction is the result of rotational or translational motion. It should also be obvious at this time that the invention may be applied in an unlimited number of ways and that the embodiments presented above for description are merely examples of a few uses to which the invention could advantageously be put.

Accordingly, having thus described the invention, what is claimed as new is:

1. A journal type of bearing device comprising: a hollow cylindrically-shaped member; a rotating shaft thrust through said member; and a transducer mechanism coupled to said hollow member for vibrating it in a radial direction at a frequency selected from the sonic and ultrasonic ranges.

2. The bearing device defined in claim 1 wherein said hollow member is made of a magnetostrictive material and said transducer mechanism is coupled to said member by means of a coil wound around a portion of said member, said coil being mounted on said member so as to be flush with the surface thereof.

3. A bearing arrangement comprising: first and second shafts coaxially aligned; a hollow cylindrically-shaped member positioned between said first and second shafts, the axis of said member being substantially aligned with the axes of said shafts; a rotating third shaft thrust through said hollow member, said third shaft being positioned intermediate said first and second shaft and substantially in axial alignment therewith; and transducer means for making said first and second shafts vibrate in an axial direction and said hollow member to vibrate in a radial direction at a frequency selected from the sonic and ultrasonic ranges.

4. Apparatus comprising: a horizontally supported platform; a transducer mechanism for producing mechanical vibrations at selected sonic and ultrasonic frequencies mounted on said platform above a point of support thereof; a flat-surface vessel horizontally supported and vertically vibrated by said transducer mechanism; and a flat-surfaced object resting freely at the center of said vessel, said object being frictionlessly supported in response to the vibrations of said vessel.

5. Apparatus for reducing friction, said apparatus comprising: a first member movable in a gaseous medium; and vibratory means for periodically compressing the gas contiguous to the surface of said first member at a frequency selected from the sonic and ultrasonic frequency range, said means being adapted to compress said gas in such a direction as to form a gaseous cushion for supporting said first member while it is moving.

References Cited by the Examiner
UNITED STATES PATENTS

| | | | |
|---|---|---|---|
| 717,924 | 1/03 | Reid | 308—159 |
| 945,712 | 1/10 | Fletcher. | |
| 2,746,813 | 5/56 | Massa | 308—1 |
| 2,993,739 | 7/61 | Hall | 308—1 |
| 3,018,142 | 1/62 | Warnock | 74—5 |
| 3,046,795 | 7/62 | Wilkerson | 74—5 |

ROBERT C. RIORDON, *Primary Examiner.*

FRANK SUSKO, *Examiner.*